United States Patent Office 3,387,056
Patented June 4, 1968

3,387,056
PROCESS FOR PREPARING STRAIGHT CHAIN ALKYL AROMATIC COMPOUNDS USING HF AND A FLUORIDE CATALYST MODIFIER
Gilbert J. McEwan, Webster Groves, and Sidney G. Clark, Creve Coeur, Mo., assignors to Monsanto Company, a corporation of Delaware
No Drawing. Filed Nov. 18, 1963, Ser. No. 324,208
9 Claims. (Cl. 260—671)

This invention relates to an improved process for the manufacture of a specific type of alkyl aryl compounds, that is, the manufacture of straight chain alkyl aryl compounds suitable for use in the production of detergent products, and is more particularly concerned with improving the yields as well as the products over those obtained by the normal alkylation of aromatic compounds with straight chain olefins using anhydrous hydrogen fluoride as the catalyst.

Alkyl aryl compounds and particularly alkyl benzene sulfonates are widely used by soap manufacturers in commercial detergent products. These alkylbenzene sulfonates are generally prepared by alkylating benzene with olefin in the presence of a suitable catalyst followed by sulfonation and neutralization. Such alkylation, however, usually produces many and varied by-products which are undesirable for use in commercial detergent products. In addition, when the olefin is of a straight chain structure the resulting alkylbenzene products usually are a mixture of isomers according to the position of the phenyl group on the alkyl chain. It is known in the art that the position of the phenyl group on the alkyl chain is an important factor in determining the surface active properties of the alkylbenzene products. In general, when the alkyl group is of a straight chain structure containing from about 12 to 14 carbon atoms per molecule, the preferred alkylbenzene products are those in which the phenyl group is attached in the vicinity of the center of the alkyl chain, that is, the 3, 4, 5, 6 and 7-phenyl isomers. Further, when alkylating with a catalyst such as anhydrous hydrogen fluoride which is believed to function in the synthesis by converting the olefin into a carbonium ion, the 1-phenyl isomer is not formed while the 2-phenyl isomer is oftentimes formed to a considerable extent. Although, in general, anhydrous hydrogen fluoride is an acceptable catalyst for alkylating benzene with olefin in so far as the alkylbenzene yields and the 2-phenyl isomer content of alkylbenzene are concerned, it can be appreciated that a method which improves the straight chain alkylbenzene yields and the 2-phenyl isomer content of the straight chain alkylbenzene products over those obtained from normal alkylation of benzene with straight chain olefins using anhydrous hydrogen fluoride as the catalyst would be extremely desirable and would represent an advancement in this art.

Therefore, it is an object of this invention to provide an improved process for producing straight chain alkyl aryl compounds suitable for use in the production of detergents.

It is another object of this invention to provide a process for improving the yields of straight chain alkylbenzene over that normally obtained by the alkylation of benzene with straight chain olefins using anhydrous hydrogen fluoride as the catalyst.

It is another object of this invention to provide a process for improving the straight chain alkylbenzene products over those normally obtained by the alkylation of benzene with straight chain olefins using anhydrous hydrogen fluoride as the catalyst.

It is a still further object of this invention to provide a process for improving the yields as well as the straight chain alkylbenzene products over those normally obtained by the alkylation of benzene with straight chain olefins using anhydrous hydrogen fluoride as the catalyst.

Other objects will become apparent from a reading of the following detailed description and claims.

It has now been found that the alkylation of benzene with straight chain olefins using substantially anhydrous hydrogen flouride as the catalyst can be improved by using a specific amount of a catalyst modifier in the alkylation reaction. In general, the catalyst modifiers which are suitable are basic inorganic fluorides, i.e., fluorides which decrease the acidity of the hydrogen fluoride catalyst, and which are soluble in amounts in which they are used in the anhydrous hydrogen fluoride catalyst. It has been unexpectedly found that when the catalyst modifier is used in certain amounts with substantially anhydrous hydrogen fluoride as the catalyst in alkylating benzene with straight chain olefins, the yields of straight chain alkylbenzene products are improved, thus resulting in less by-product formation and thereby improving the economics of the process. Further, the resulting straight chain alkylbenzene products contain a lower 2-phenyl isomer content thereby improving the product quality of the resulting detergent product. A further unexpected feature is that the use of the catalyst modifier with anhydrous hydrogen fluoride is specific to straight chain olefins and, in fact, is deleterious to the alkylation of benzene with branched chain olefins, at least in so far as yields are concerned. In addition, it should be noted that the amounts of catalyst modifier which are suitable are important, and, in general, amounts greatly different from those specified herein are deleterious to the alkylation of benzene with straight chain olefins at least in so far as yields are concerned. All of the foregoing will be more fully discussed hereinafter.

Olefins which are suitable for use in the instant invention are high molecular weight straight chain olefins, preferably mono-olefins, and can be the alpha-olefin type or the internal double-bond olefin type. As illustrative of the preferred straight chain olefins are the alpha-olefins obtained from such sources as the thermal cracking of petroleum wax, fat derived alcohols and ethylene polymerization. Additionally, as illustrative of the preferred straight chain olefins are the internal double-bond olefins obtained from the dehydrogenation of n-paraffins, the dehydrohalogenation of monochlorinated n-paraffins, and the isomerization of straight chain alpha-olefins. Straight chain olefins containing from about 6 to 20 carbon atoms are preferred and can be the relatively pure olefin, such as 1-dodecene, or a mixture of straight chain olefins such as the $C_{10}$–$C_{15}$ mixture averaging between about 12 to 14 carbon atoms per molecule. Because of the relatively inexpensiveness, availability and their ability to produce a superior detergent product, the straight chain olefins $C_{10}$–$C_{15}$ mixture and averaging about 12 to 14 carbon atoms per molecule are especially preferred.

Since alkylbenzene is most commonly used in the preparations of detergents, the instant invention is disclosed with reference to a process for the manufacture of those products, although it will be apparent that it may be equally advantageously employed to prepare other alkyl aryl compounds. For example, the hydroxy substituted and mono- and di-lower alkyl substituted (1 to 4 carbon atoms) monocyclic aromatic compounds, such as phenol, toluene, and xylene as well as the dicyclic aromatic compounds such as naphthalene, are exemplary but not limitative of the aromatic compounds which are suitable for use in the invention.

As previously mentioned, the catalyst modifiers which are suitable for use with the hydrogen fluoride catalyst are the basic inorganic fluorides, i.e., fluorides which decrease the acidity of the hydrogen fluoride catalyst, and which are soluble in amounts in which they are used in the anhydrous hydrogen fluoride catalyst. Such basic inorganic fluorides include the alkali metal fluorides such as sodium, potassium, lithium and cesium. In addition, such basic inorganic fluorides include the alkaline earth metal fluorides such as calcium fluoride and magnesium fluoride. In general, the alkali metal fluorides are preferred, especially the sodium and potassium fluorides with the sodium fluoride being especially preferred. The catalyst modifiers are used with the anhydrous hydrogen fluoride catalyst in amounts of hydrogen fluoride to inorganic fluorides on a molar ratio basis of from about 1:.0001 to about 1:.01 with the preferred molar ratio being from about 1:.002 to about 1:.006. In most cases, the catalyst modifier can be added to the catalyst prior to introduction into the alkylation zone or can be added prior to or subsequent to the addition of the catalyst into the alkylation zone, but in any event the catalyst having the catalyst modifier dissolved therein must be formed prior to contact with all of the reactants. It is preferred, however, in both the batch-type process and the continuous-type process of alkylation to form the catalyst having the catalyst modifier dissolved therein prior to its introduction into the alkylation zone. It should be noted that the basic inorganic fluoride modifier can be formed in situ in the anhydrous hydrogen fluoride catalyst by such means as the addition of alkali metal and/or alkaline earth metal hydroxides to the anhydrous hydrogen fluoride in order to form the alkali metal and/or alkaline earth metal fluorides dissolved in the anhydrous hydrogen fluoride.

In general, alkylation conditions which are suitable for normal anhydrous hydrogen fluoride catalyst alkylations are suitable for use in practicing the present invention. In most cases, the olefin to catalyst molar ratio ranges from about 1:5 to about 1:25 with about 1:12 to 1:18 being preferred and the benzene to olefin molar ratio preferably ranges from about 5:1 to 20:1, although benzene in excess of the 20:1 ratio may be used without any apparent decrease in efficiency. The sojourn, that is the time period inclusive of the addition of the reactant in the catalyst into the reaction zone to the termination of alkylation in the reaction, is usually about 10 to 20 minutes although as little as 1 minute may sometimes be sufficient depending upon process conditions used. The temperature used in the alkylation reaction can be within the range of from about −30° to about 100° C. with from about 0 to about 50° C. being preferred. Superatmospheric pressures sufficient to maintain the catalyst and reactants in the liquid phase are preferably maintained during the alkylation reaction and such pressures are dependent upon reactants used and conditions maintained in the alkylation reaction and, in general, are usually no greater than about 100 atmospheres.

After the alkylation reaction has been completed to the extent desired, the catalyst phase is usually separated and the reaction products and unreacted reactants, if any, are fractionally distilled in order to separate the desired alkylbenzene products from the undesired by-products and unreacted reactants. In some cases it may be necessary to further treat the alkylbenzene products in order to improve their purity such as by washing with water and/or caustic. There are many different methods and process conditions for recovering the desired alkylbenzene products from the reaction zone which, in general, are directed to the immediately foregoing processing steps, and, in general, any of the conventional type methods can be used and the conditions necessary for such methods are well-known to those skilled in the art in alkylating hydrocarbons and can be readily determined. The following example is presented to illustrate the invention with parts by weight being used in the example unless otherwise indicated.

Example 1

The alkylation reactions were carried out in the alkylator equipped with a stirrer, thermo couple, cooling coil and sample port. The benzene and catalyst were charged to the alkylator and the olefins were added over a period of about 5 to 10 minutes while the mixture was maintained at a temperature of about 6° C. The reaction mixture was stirred for an additional 15 minutes, then allowed to settle. The catalyst phase separated as a lower layer from the alkylated liquor phase. The layers were separated and the alkylated liquor was washed with caustic and then water and analyzed. A 10:1 molar ratio of benzene to olefin and a 15:1 molar ratio of HF to olefin were used for all alkylations. The catalyst modifier, when used, was NaF which was dissolved in the catalyst in proportions as indicated prior to charging of the olefin to the alkylator.

The analysis of product distribution was made by fractional distillation on the basis of vapor temperature and refractive index. The alkylbenzene cut was taken between a minimum $N_d^{25}$ of 1.4825 at a minimum vapor temperature of 105° C. at 2 mm. and a minimum $N_d^{25}$ of 1.4800 and a maximum $N_d^{25}$ of 1.4900 at a maximum vapor temperature of 170° C. at 2 mm.

The isomer distribution analyses were determined by Vapor Phase Chromatography of the washed alkylated liquor. The instrument used was a Barber-Coleman model 20 Chromatograph equipped with a Sr–90 ionization detector and coupled integrator. The column used was a 150′ x .02″ stainless steel capillary coated with SE–30 Silicon Gum Rubber. Column temperature and pressures used for the analyses were 188° C. and 4 to 5 p.s.i.g. Calculations of the percent 2-phenyl isomer were made on the basis of the integrator count after compensating for base line corrections.

The following table summarizes the results of various alkylations and isomer distribution analyses with the variables used as noted, as well as a comparison of product distribution of alkylations made with straight chain olefins and branched chain olefins using similar catalyst to catalyst modifier molar ratios.

TABLE I

| Catalyst (molar ratio) | Product Distribution (percent by weight) | | Isomer Distribution* (percent 2-phenyl) |
|---|---|---|---|
| | alkylbenzene | By-product | |
| (1) HF | 81.5 | 18.5 | 18.3 |
| (2) HF:NaF (1:.00214) | 83.0 | 17.0 | 16.9 |
| (3) HF:NaF (1:.01) | 81.7 | 18.1 | 16.6 |
| (4) HF:NaF (1:.02) | 74.5 | 25.5 | 16.5 |
| (5) HF | 88.1 | 11.9 | |
| (6) HF:NaF (1:.0025) | 83.7 | 16.3 | |
| (7) HF:NaF (1:.014) | 73.8 | 26.2 | |
| (8) HF:NaF (1:.0216) | 57.0 | 43.0 | |

*Percent 2-phenyl of C-12 fraction of alkylbenzene.

NOTE.—Alkylations (1) through (4) were made with $C_{10}$–$C_{15}$ straight chain olefins containing at least about 95% 1-olefin. Alkylations (5) through (8) were made with $C_{11}$–$C_{15}$ branched chain olefins of polypropylene type.

As can be observed from the above table, when alkylating benzene with straight chain olefins using the catalyst modifier of the present invention in amounts as specified herein (alkylations 2 and 3) significant improvements in both the yield of the alkylbenzene products and the lowering of the 2-phenyl isomer content of these products were achieved as compared to the use of anhydrous hydrogen fluoride only as the catalyst (alkylation 1). When using greater amounts of the catalyst modifier than specified herein (alkylation 4) no improvement in yield was achieved, in fact, the yield was significantly lower. Alkylations 5 through 8 indicate that the catalyst modifier of the present invention regardless of the amounts used do not achieve yields as high as the yields achieved by use of anhydrous hydrogen fluoride as the catalyst when benzene is alkylated with branched chain olefins. As can be appreciated, therefore, not only are the amounts of the catalyst modifier specific but also the type of olefin, that is, straight chain olefin versus branched chain olefin, is important in the type of yields obtained over that obtained by normal alkylation using hydrogen fluoride as the catalyst. In addition, it should be noted that similar or comparable results are also obtained under substantially the same process conditions when using other alkali metal fluorides and/or alkaline earth metal fluorides such as potassium fluoride and calcium fluoride, as the catalyst modifier in equivalent molar amounts as well as when using other straight chain olefin material such as the $C_{10}$–$C_{15}$ internal double bond olefin mixture and averaging between about 12 to 14 carbon atoms per molecule obtained from the dehydrogenation of normal paraffins and the dehydrohalogenation of monochlorinated normal paraffins. Also, it should be noted that other aromatic compounds, such as phenol, toluene and naphthalene can be alkylated with straight chain olefins under substantially the same process conditions with similar or comparable results.

What is claimed is:

1. In the method for preparing straight chain alkylaryl compounds by the alkylation of an aromatic compound with a straight chain olefin containing between about 6 to about 20 carbon atoms per molecule using a substantially anhydrous hydrogen fluoride catalyst, said aromatic compound being selected from the group consisting of benzene, phenol, toluene, naphthalene, and xylene, the improvement comprising carrying out said alkylation in the presence of said catalyst having dissolved therein a basic inorganic fluoride catalyst modifier selected from the group consisting of alkali metal fluorides and alkaline earth metal fluorides in amounts of a molar ratio basis of catalyst to catalyst modifier of from about 1:.001 to 1:.01.

2. The method of claim 1, wherein said aromatic compound is benzene.

3. The method of claim 2, wherein said catalyst to catalyst modifier molar ratio is from about 1:.002 to about 1:.006.

4. In the method for preparing straight chain alkylaryl compounds by the alkylation of on aromatic compound with a straight chain olefin mixture containing between about 10 to 15 carbon atoms per molecule and averaging between about 12 to 14 carbon atoms per molecule using a substantially anhydrous hydrogen fluoride catalyst, said aromatic compound being selected from the group consisting of benzene, phenol, toluene, naphthalene, and xylene, the improvement comprising carrying out said alkylation in the presence of said catalyst having dissolved therein the basic inorganic fluoride catalyst modifier selected from the group consisting of alkali metal fluorides and alkaline earth metal fluoride in amounts on a molar ratio basis of catalyst to catalyst modifier of from about 1:.001 to 1:.01.

5. The method of claim 4, wherein said aromatic compound is benzene.

6. The method of claim 5, wherein said alkali metal fluoride is sodium fluoride.

7. The method of claim 6, wherein said catalyst to catalyst modifier molar ratio is from about 1:.002 to about 1:.006.

8. The method of claim 7, wherein said olefin is a straight chain alpha-olefin.

9. The method of claim 7, wherein said olefin is a straight chain internal double-bond olefin.

References Cited
UNITED STATES PATENTS

| | | | |
|---|---|---|---|
| 2,384,294 | 9/1945 | Frey | 260—671 |
| 2,495,775 | 1/1949 | Passino | 260—683.51 |
| 2,639,303 | 5/1953 | Linn et al. | 260—671 |

DELBERT E. GANTZ, *Primary Examiner.*

C. R. DAVIS, *Assistant Examiner.*